United States Patent [19]
Marumoto et al.

[11] Patent Number: 5,774,190
[45] Date of Patent: Jun. 30, 1998

[54] ENCODER WITH AN ON-SCREEN DISPLAY FUNCTION

[75] Inventors: Kyoji Marumoto; Masahito Kondo, both of Kyoto, Japan

[73] Assignee: Rohm Co., Ltd., Kyoto, Japan

[21] Appl. No.: 733,821

[22] Filed: Oct. 18, 1996

[30] Foreign Application Priority Data

Oct. 20, 1995 [JP] Japan .................................. 7-272232

[51] Int. Cl.$^6$ .................................................. H04N 5/445
[52] U.S. Cl. .......................................... 348/563; 348/705
[58] Field of Search .................................... 348/563, 705, 348/706, 708, 564, 565, 566, 569, 584, 588; H04N 5/445

[56] References Cited

U.S. PATENT DOCUMENTS 5,574,509  11/1996  Citta ........................................ 348/563

Primary Examiner—Sherrie Hsia
Attorney, Agent, or Firm—Nikaido, Marmelstein, Murray & Oram LLP

[57] ABSTRACT

An encoder has a function of converting received digital RGB signals into analog television signals and a function of displaying on-screen displays. An internal chrominance signal generating section is driven and controlled by subsidiary display data supplied from outside via a subsidiary display data input terminal to output digital subsidiary display chrominance signals. A multiplexer selects and alternatively outputs either received main display signals or subsidiary display chrominance signals from the internal signal generating section. Switching of the multiplexer is controlled by a switching signal that is supplied from outside via a terminal.

7 Claims, 5 Drawing Sheets

ENCODER WITH AN ON-SCREEN DISPLAY FUNCTION

BACKGROUND OF THE INVENTION

1. Field of the Invention

The present invention relates to an encoder for converting digital display signals into analog television signals.

2. Description of the Prior Art

RGB encoders are employed in electronic appliances such as video CD players and digital video disc (DVD) players in order to convert reproduced digital RGB signals into analog television signals (luminance signal $Y_A$ and chrominance signal $C_A$, and composite signal $S_A$).

FIG. 1 shows a conventional image reproduction system. Reference numeral 40 represents an MPEG (Moving Picture Image Coding Experts Group) core chip for compressing and outputting image data. MPEG refers to a set of standards related to compression and expansion of video signals among various standards formulated by ISO (International Organization for Standardization). The MPEG core chip 40 outputs digital chrominance signals $R_D$, $G_D$, and $B_D$, which are then converted by an RGB encoder 41 into an analog luminance signal $Y_A$, an analog composite signal $S_A$, and an analog chrominance signal $C_A$.

The outputs of the RGB encoder 41 are supplied to a television set 42 equipped with video input terminals, and are reproduced on the screen.

The television set 42 processes either the combination of the luminance signal ($Y_A$) and the chrominance signal ($C_A$), or the composite signal ($S_A$) alone, depending on the functions with which the television set 42 is provided. To cope with either case, the RGB encoder 41, which is formed as an IC (integrated circuit), is designed to output a luminance ($Y_A$) signal and a chrominance signal ($C_A$), and also a composite signal ($S_A$) at the same time.

In this type of reproduction system, subsidiary displays (on-screen displays) are performed on the screen with the help of a subsidiary display circuit provided in the television set 42. FIG. 2 shows an example of the portion for controlling on-screen displays in a conventional system.

In FIG. 2, reference numeral 30 represents a control IC, which is formed as a microcomputer. Reference numeral 31 represents a Y/C signal processing IC, which processes a television signal S supplied from the RGB encoder 41 and outputs a video signal.

Reference numeral 32 represents an on-screen display IC, which includes a logic circuit 33, a ROM 34, a RAM 35, a luminance signal generating circuit 36, and a switch 37. The ROM 34 is a character generator. The RAM 35 generates display position data representing the position of an on-screen display in accordance with a serial I/O signal from the control IC 30. The outputs of the ROM and the RAM are supplied to the luminance signal generating circuit 36. To the other input terminal of the switch 37, the video signal is supplied from the Y/C signal processing IC 31.

Using a synchronizing signal supplied from the Y/C signal processing IC 31 as a reference, the logic circuit 33 outputs a signal representing the position of the on-screen display based on the display position data from the RAM 35. The output of this logic circuit 33 is used as a switching signal to control the switch 37.

However, the above described conventional system employs the same method of controlling on-screen displays as is used for reproducing television broadcast signals, and therefore it is difficult for such a system to control on-screen displays of reproduction-related information in a video CD player or DVD player. In these appliances, information concerning the signal source should preferably be included in the television signal before it is supplied to the television set 42, rather than produced and inserted in the television signal within the television set 42.

Moreover, the above described conventional system needs to handle an analog signal at the switch in the on-screen display IC. That is, it is inevitable to let an analog signal pass through the inside of a chip where digital circuits such as the logic circuit, the ROM, and the RAM are operating at a high clock frequency. This causes noise in the video signal.

SUMMARY OF THE INVENTION

An object of the present invention is to provide an encoder for realizing a subsidiary display system in which on-screen displays (subsidiary displays) are processed in a signal-source-E side device and in which the switching of video signals during the processing of on-screen displays causes less noise.

To achieve the above object, according to the present invention, an encoder for converting digital RGB signals into analog television signals is provided with an input terminal for receiving a digital main display signal reproduced from a recording medium; a subsidiary display data input terminal; a subsidiary display signal generating means driven and controlled by said subsidiary display data to output a digital subsidiary display signal; a multiplexing means for adding a subsidiary display signal to a main display signal; a D/A conversion circuit for converting an output of the multiplexing means into an analog television signal; and an output terminal for supplying said television signal to a television set.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
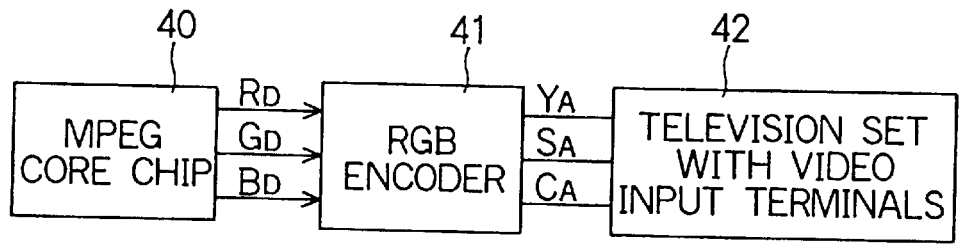
FIG. 1 is a block diagram showing a conventional circuit for generating on-screen display signals.
Figure 2:
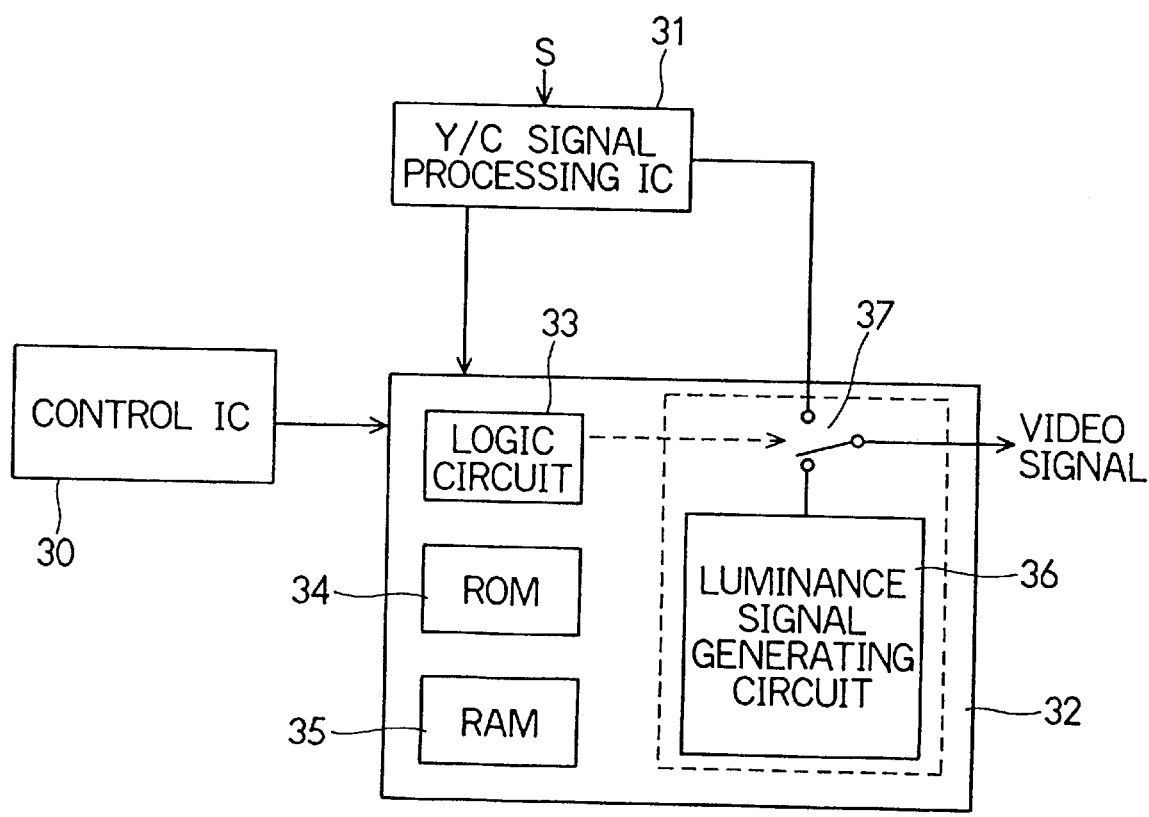
FIG. 2 is a block diagram showing how an RGB encoder is conventionally employed.
Figure 3:
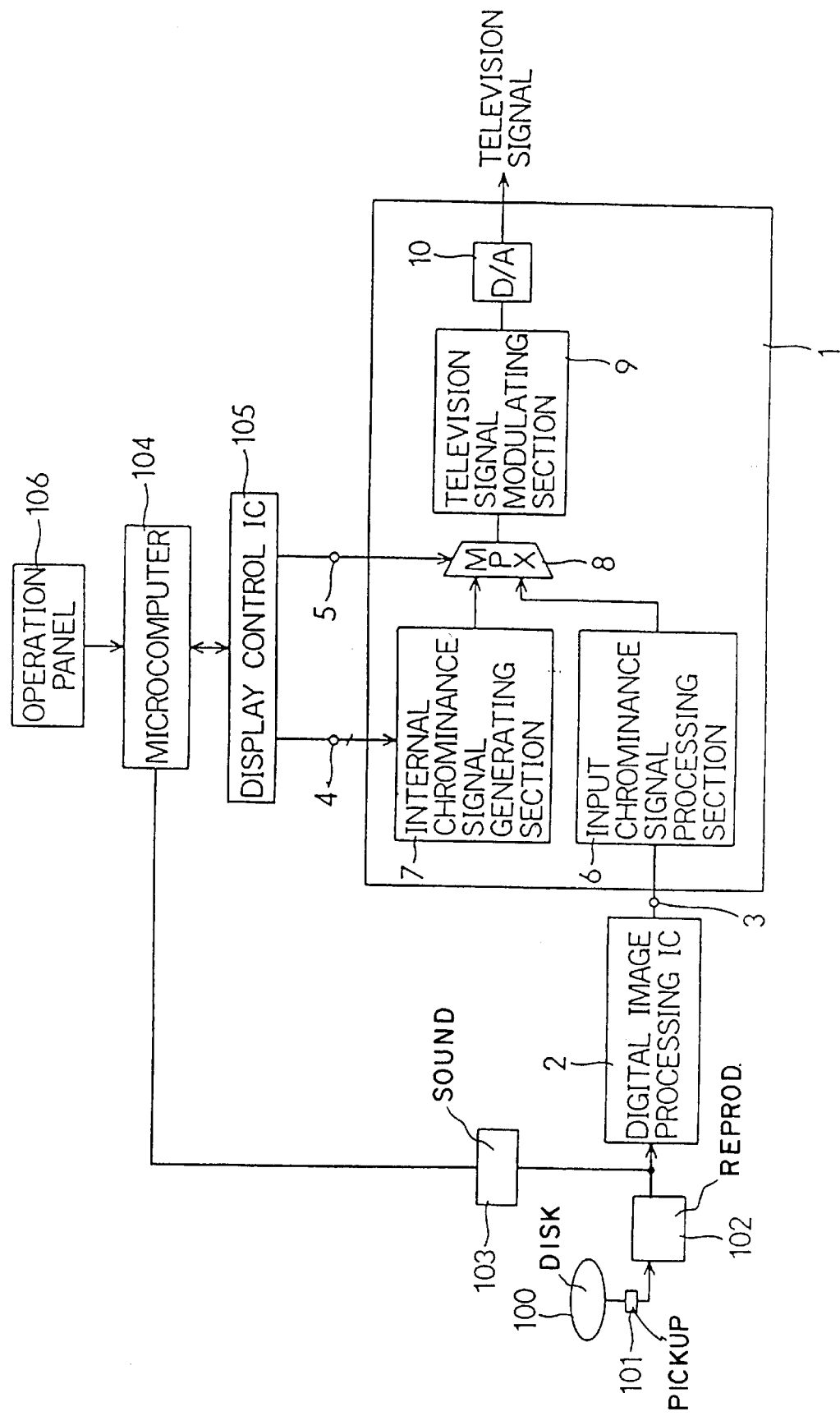
FIG. 3 is a block diagram showing an encoder of a first embodiment of the present invention.

Hereinafter, an embodiment of the present invention will be described with reference to the drawings. In FIG. 3, reference numeral 1 represents an RGB encoder, which is formed as a one-chip IC (integrated circuit). To an input terminal 3 of the encoder 1, digital RGB signals are supplied from a digital image processing IC 2. The digital image processing IC 2 corresponds to, in the case of a video CD player or DVD player, the MPEG core chip 40 as shown in FIG. 1.

The received digital RGB signals are processed by an input chrominance signal processing section 6, and are then delivered into a multiplexer 8. The multiplexer 8 also receives subsidiary display chrominance signals from an internal chrominance signal generating section 7. The internal chrominance signal generating section 7 comprises a palette table RAM, in which, for example, a plurality of chrominance signals are stored. The chrominance signals are read out from the RAM using, as address signals, subsidiary display data that is supplied from a display control IC 105 via a subsidiary display data input terminal 4.

The switching operation of the multiplexer 8 is controlled by a switching signal supplied from the display control IC 105 via a switching signal input terminal 5. It is possible to use a subsidiary-display-enable signal as the switching signal. In that case, the multiplexer 8 outputs the subsidiary display chrominance signals from the internal chrominance signal generating section 7 only when the enable signal is supplied, and otherwise outputs the digital RGB signals from the input chrominance signal processing section 6.

In either case, the multiplexer 8 outputs digital chrominance signals (RD, GD, and BD), which are then converted by a television signal modulating section 9 into television signals. Outputted as the television signals here are a luminance signal and a chrominance signal, and a composite signal. These signals are all digital signals, and therefore they are then converted by a D/A conversion section 10 into analog signals before being outputted.

If the received subsidiary display data is such that indicates whether the sounds included in the signal detected from a disk 100 by a pickup 101 and reproduced by a reproduction system 102 are stereophonic or monophonic, information detected by a sound system detecting circuit 103 is transferred to a microcomputer 104. If the information indicates stereophonic sounds, the microcomputer 104 controls the display control IC 105 to output data representing stereophonic sounds. This data is supplied to the terminal 4. At the same time, the display control IC 105 also outputs a switching signal, and supply it to the terminal 5. The internal chrominance signal generating section 7, using as an address the data received from the terminal 4, outputs digital RGB signals representing stereophonic sounds. These signals are supplied through the multiplexer 8 to the television signal modulating section 9.

There are various items that can be displayed as subsidiary displays. For example, it is possible to indicate, as a subsidiary display, whether the reproduction system 102 is in a "play" or "pause" state. The user can select what to display as a subsidiary display by use of an operation panel 106. The output generated by the operation panel 106 as a result of its operation is fed to the microcomputer 104.

Figure 4:
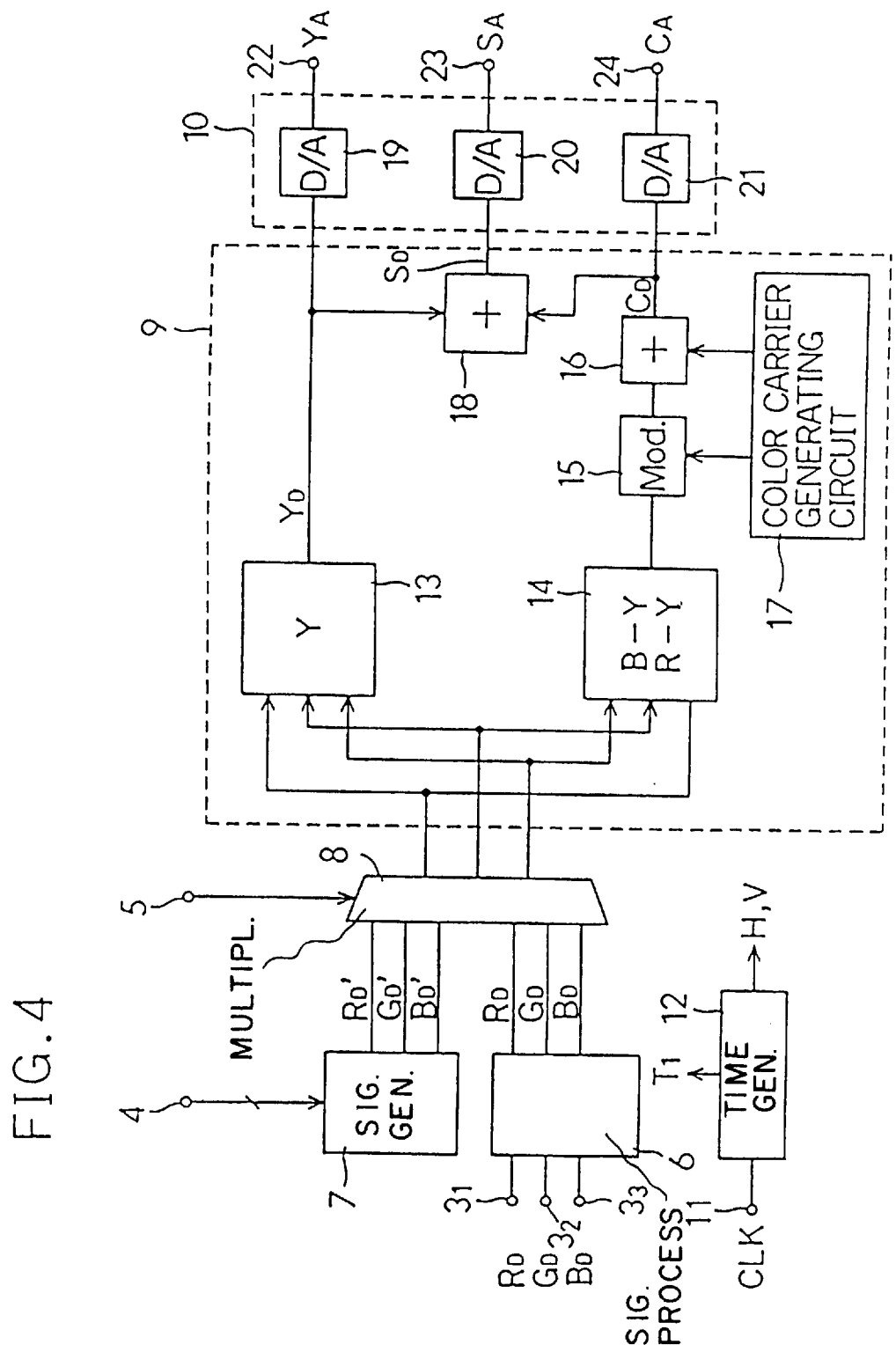
FIG. 4 is a block diagram showing the details of the first embodiment.

FIG. 4 shows the details of a portion of the construction shown in FIG. 3, in particular the television signal modulating section 9 and the D/A conversion section 10. Reference numerals $3_1$, $3_2$, and $3_3$ represent input terminals for receiving RGB digital signals $R_D$, $G_D$, and $B_D$. The input chrominance signal processing section 6 is composed of latch circuits so as to latch and output the received signals $R_D$, $G_D$, and $B_D$. Reference numeral 12 represents a timing signal generating circuit for generating a timing signal $T_1$ and horizontal and vertical synchronizing signals H and V based on a clock CLK received via a terminal 11. The above-mentioned latch circuits operate according to the timing provided by the timing signal $T_1$. The internal chrominance signal generating section 7 also outputs RGB digital signals $R_D'$, $G_D'$, and $B_D'$.

The multiplexer 8 outputs either ($R_D$, $G_D$, and $B_D$) or ($R_D'$, $G_D'$, and $B_D'$). Reference numeral 13 represents a luminance signal forming circuit for forming a digital luminance signal ($Y_D$) based on the digital RGB signals ($R_D$, $G_D$, and $B_D$) or ($R_D'$, $G_D'$, and $B_D'$). The output of the luminance signal forming circuit 13 is delivered into a D/A converter 19. Reference numeral 14 represents a color difference signal forming circuit for forming digital B-Y and R-Y signals based on the digital RGB signals ($R_D$, $G_D$, and $B_D$) or ($R_D'$, $G_D'$, and $B_D'$). The outputs of the color difference signal forming circuit 14 are fed to a modulating circuit 15, where they modulate a carrier supplied from a color carrier generating circuit 17 to form a modulated signal. Then, in an adder 16, the color carrier is inserted in a color burst position as a color burst signal.

The resulting compound signal is supplied to a D/A converter 21. Reference numeral 18 represents an adder for adding the luminance signal ($Y_D$) to the chrominance signal ($C_D$) to form and output a composite signal ($S_D$). The output of the adder 18 is supplied to a D/A converter 20.

The D/A conversion section 10 is provided with three D/A converters 19, 20, and 21 described above, so that each of the received signals is converted by a separate D/A converter 19, 20, or 21 into an analog signal. As a result, an analog luminance signal ($Y_A$) appears at an output terminal 22, an analog composite signal ($S_A$) appears at an output terminal 23, and an analog chrominance signal ($C_A$) appears at an output terminal 24.

Figure 5:
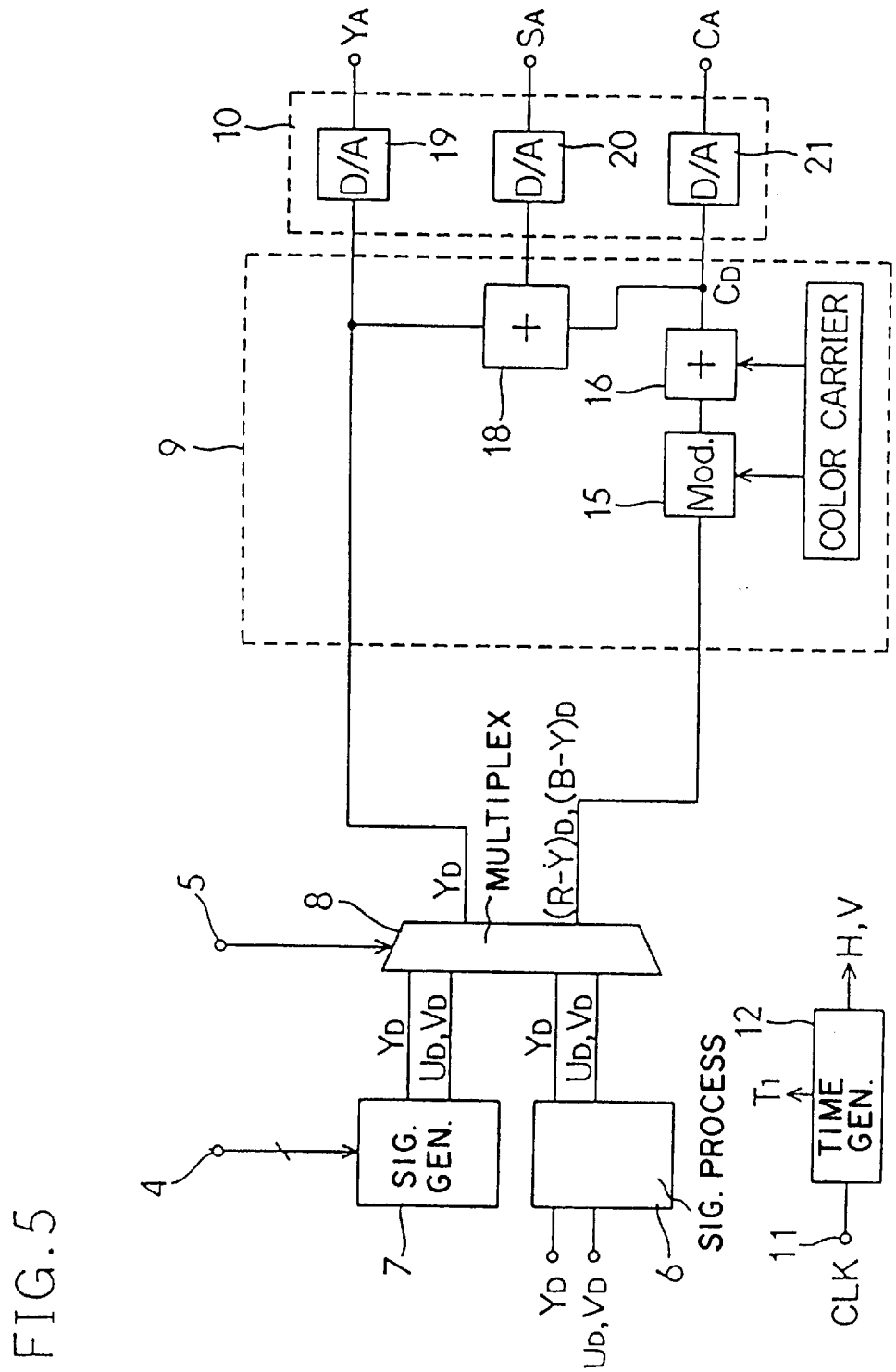
FIG. 5 is a block diagram showing an encoder of a second embodiment of the present invention.
Figure 6:
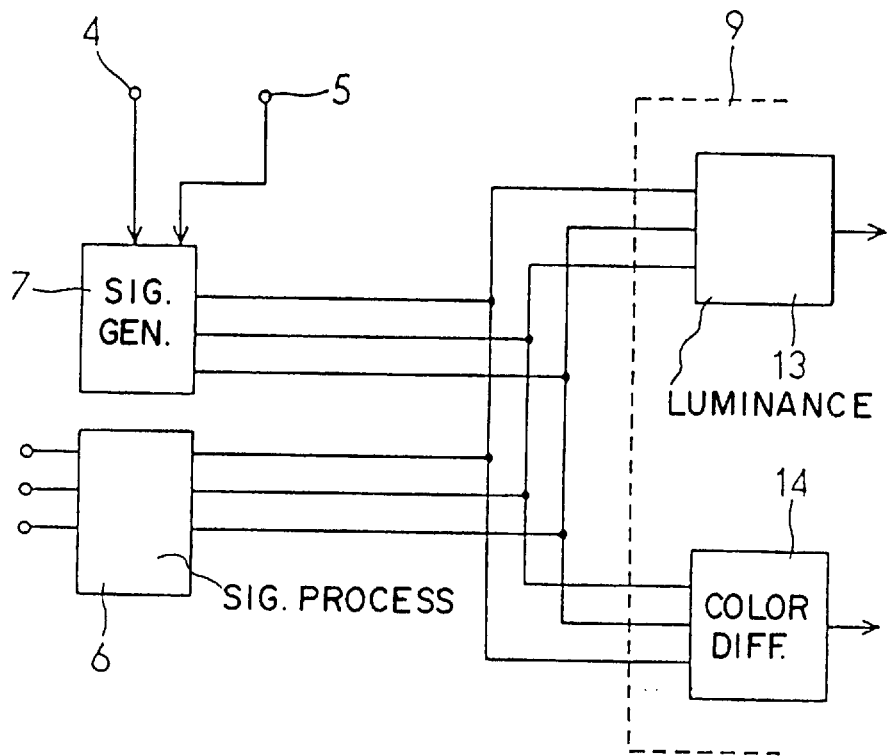
FIG. 6 is a diagram showing a modified version of the embodiment shown in FIG. 4.
Figure 7:
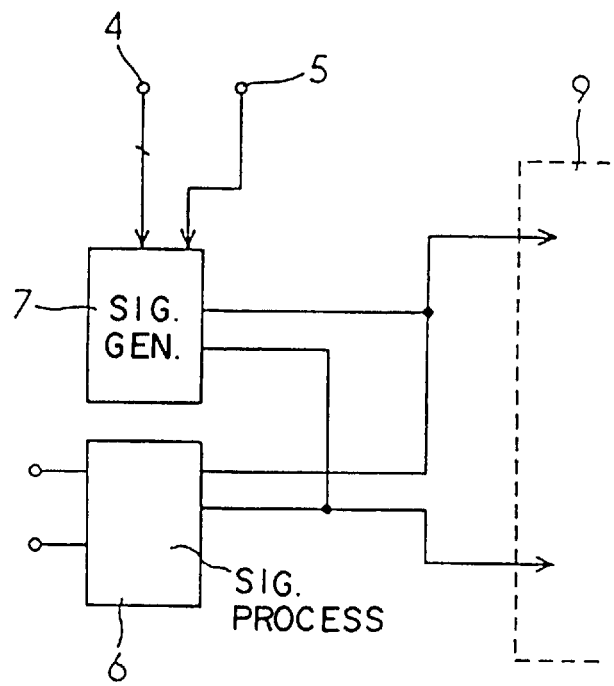
FIG. 7 is a diagram showing a modified version of the embodiment shown in FIG. 5.

FIG. 5 shows a circuit construction for the cases where the digital display signals that are to be converted into analog television signals are received as a combination of a luminance signal $Y_D$ and two color difference signals $U_D$ and $V_D$. In general, $U_D$ is (B-Y)$_D$ and $V_D$ is (R-Y)$_D$. In this case, the luminance signal forming circuit 13 and the color difference signal forming circuit 14 shown in FIG. 4 are no more necessary, and accordingly are excluded here. In other respects, the circuit construction of FIG. 5 is the same as that of FIG. 4. As described above, it is also possible to supply an enable signal to the terminal 5. In that case, part of the circuit construction shown in FIG. 4 or 5 can be modified as shown in FIG. 6 or 7, respectively.

As described above, according to the present invention, insertion of signals for subsidiary displays is processed within an encoder for converting digital RGB signals, such as signals reproduced on a digital video disc player or the like, into analog television signals. Accordingly, it is easy to display signal-source-related information (such as the title of the video being reproduced, and the remaining playing time) as a subsidiary display on the screen.

Moreover, according to the present invention, even when the encoder 1 is formed as an integrated circuit that includes a high-speed clock, the television signals outputted from the encoder are not affected by noise, because the switching between subsidiary display signals and main display signals is performed at a stage where those signals are digital.

Furthermore, according to the present invention, the internal chrominance signal generating section includes a palette table memory in which a plurality of subsidiary display chrominance signals are stored beforehand, and such chrominance signals can be read out by use of received subsidiary display data as address signals. Accordingly, it is possible to simplify the generation of subsidiary display chrominance signals. Moreover, it is also possible to display subsidiary displays in various colors simply by increasing chrominance signal data that is stored in the palette table memory.

What is claimed is:

1. An encoder for converting digital display signals into analog television signals, comprising:

an input terminal for receiving a digital main display signal reproduced from a recording medium;

a subsidiary display data input terminal;

a subsidiary display signal generating means driven and controlled by subsidiary display data from said subsidiary display data input terminal to output a digital subsidiary display signal;

a multiplexing means for adding a subsidiary display signal to a main display signal;

a D/A conversion circuit for converting an output of the multiplexing means into an analog television signal;

and an output terminal for supplying said television signal to a television set.

2. An encoder as claimed in claim 1, wherein said digital display signals are digital R, G, and B signals.

3. An encoder as claimed in claim 1, wherein said digital display signals are a digital luminance signal and two digital color difference signals.

4. An encoder as claimed in claim 1, wherein said multiplexing means comprises a switching means for alternatively outputting either the main display signal or the subsidiary display signal.

5. An encoder for converting digital RGB signals into analog television signals, comprising:

an input terminal for receiving a digital RGB signal as a main display signal;

a subsidiary display data input terminal;

an internal chrominance signal generating section driven and controlled by subsidiary display data supplied from outside via said subsidiary display data input terminal to output a subsidiary display chrominance signal;

a switching means for selecting and alternatively outputting either the received main display signal or the subsidiary display chrominance signal from said internal chrominance signal generating section; and a switching signal input terminal for receiving a switching signal for controlling said switching means.

6. An encoder as claimed in claim 5, wherein said internal chrominance signal generating section includes a palette table memory in which a plurality of subsidiary display chrominance signals are stored beforehand, and the chrominance signals are read out by use of the received subsidiary display data as an address signal.

7. An encoder as claimed in claim 5, wherein said switching signal is a subsidiary-display-enable signal, and wherein said switching means selects the subsidiary display chrominance signal from said internal chrominance signal generating section only when the switching signal is supplied and otherwise selects the main display signal.

* * * * *